United States Patent
Barbieux

(10) Patent No.: US 6,412,766 B2
(45) Date of Patent: Jul. 2, 2002

(54) HIGH PRECISION EXPANDING MANDREL WITH CYLINDRICAL OR COMPENSATED GRIPPING

(75) Inventor: Jacques Barbieux, Louvres (FR)

(73) Assignee: Sandvik Tobler S.A., Louvres (FR)

( * ) Notice: Subject to any disclaimer, the term of this patent is extended or adjusted under 35 U.S.C. 154(b) by 0 days.

(21) Appl. No.: 09/799,727

(22) Filed: Mar. 7, 2001

(30) Foreign Application Priority Data

Mar. 13, 2000 (FR) .............................................. 00 03163

(51) Int. Cl.[7] .................................................. B23Q 3/14
(52) U.S. Cl. ........................... 269/48.1; 82/44; 279/2 R; 279/2.12; 279/2.17
(58) Field of Search ........................ 269/48.1, 47, 48.2, 269/48.3, 48.4; 292/68.2, 72 R, 72 B, 130, 13; 82/44; 279/2 R; 408/106

(56) References Cited

U.S. PATENT DOCUMENTS

| | | | |
|---|---|---|---|
| 1,427,155 A | | 8/1922 | Haven |
| 2,870,686 A | | 1/1959 | Smith et al. |
| 3,017,192 A | | 1/1962 | Illowsek |
| 4,106,784 A | * | 8/1978 | Davis .......................... 279/2 R |
| 4,387,845 A | * | 6/1983 | Mefferd ...................... 228/222 |
| 5,284,229 A | * | 2/1994 | Logan ......................... 118/107 |
| 5,324,049 A | * | 6/1994 | Mistrater ................... 279/2.17 |

FOREIGN PATENT DOCUMENTS

FR 2166564 8/1973

* cited by examiner

*Primary Examiner*—Joseph J. Hail, III
*Assistant Examiner*—Daniel Shanley
(74) *Attorney, Agent, or Firm*—Finnegan, Henderson, Farabow, Garrett & Dunner, L.L.P.

(57) ABSTRACT

The invention provides a mandrel comprising a shaft (1) the forward end of which has the shape of a forward pointing truncated cone (7), an expanding sleeve (15) constituted by a ring provided with longitudinal slits designed to slide over said conical forward end (7), and a piston (8) which is guided in a cylindrical bore provided along the axis of the mandrel shaft (1), from which it projects forwards, with the sliding of said piston (8) driving said sleeve (15) so as to control the gripping or the releasing on said mandrel of a workpiece to be machined. According to the invention, the forward end of the piston (8) has the shape of a rearward pointing truncated cone (12), and the inner wall of the sleeve (15) has the shape of two successive truncated cones (17, 18) orientated mirror image fashion, with the apex angle of the forward cone (18) of the sleeve (15), which is capable of mating with said cone (12) of the piston, being greater than the apex angle of the rear cone (17) of the sleeve (15), which is capable of mating with said cone (7) of the shaft (1).

Application to the gripping of workpieces having a cylindrical or conical bore.

3 Claims, 2 Drawing Sheets

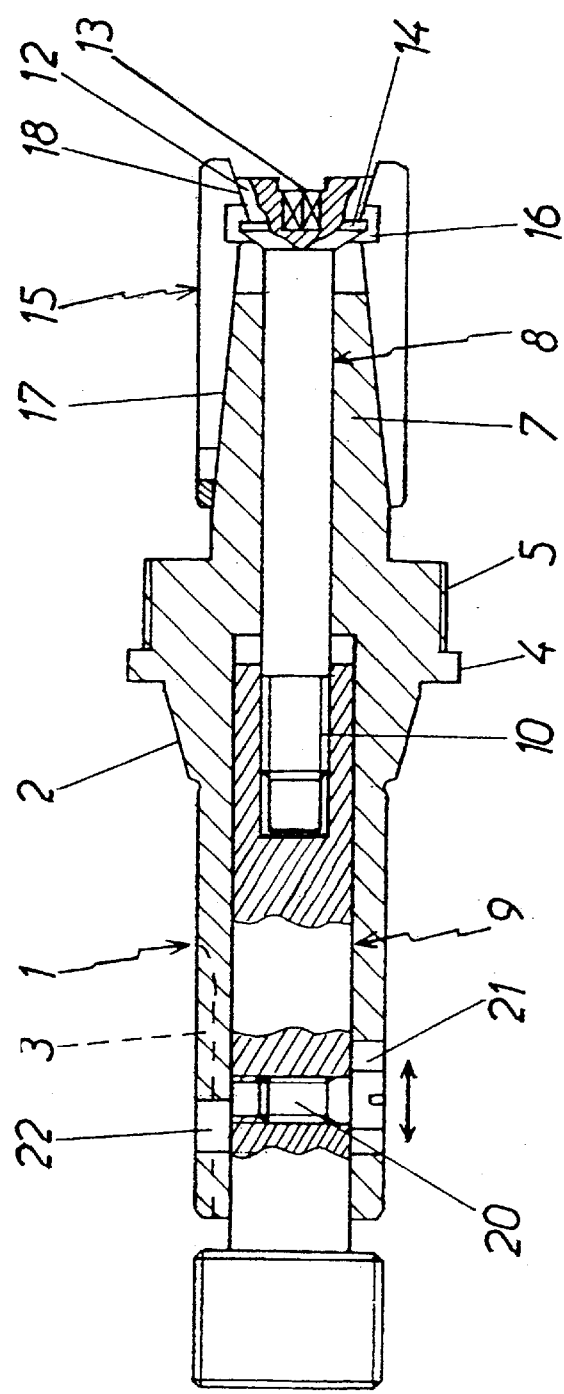
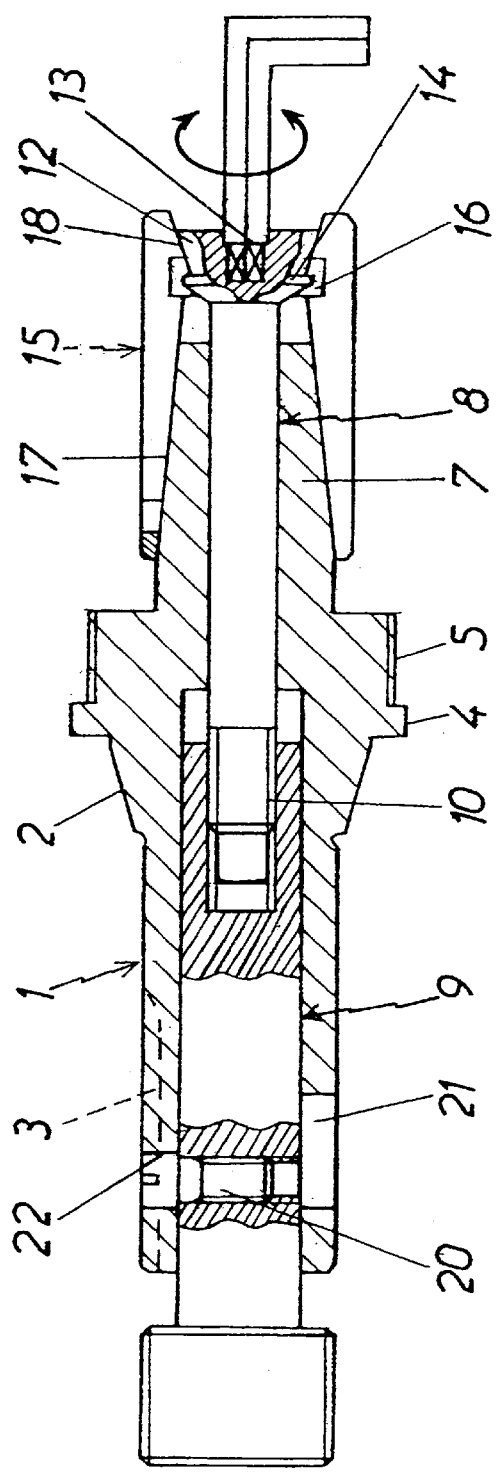

HIGH PRECISION EXPANDING MANDREL WITH CYLINDRICAL OR COMPENSATED GRIPPING

The present invention relates to an expanding mandrel, that is to say to a mandrel designed to grip a workpiece to be machined (milling, turning, grinding) by pressing an expandable portion of the mandrel against the walls of an axial bore provided in said workpiece. Expanding mandrels are usually secured to the forward face of a machine spindle using a locking nut.

There is also known a first type of expanding mandrel, the body ("mandrel shaft") of which comprises a forward portion having, prior to gripping, the shape of a hollow cylinder provided with several longitudinal slits. This split portion is caused to expand by sliding a conical head rod along its axis, so that the split portion assumes, during gripping, a conical shape the apex angle of which progressively increases. When said mandrel is mounted on the machine spindle, the rear portion of the conical head rod is screwed onto a tie member which can be caused to slide along the axis of the machine spindle to control the gripping or releasing of the workpiece.

This type of mandrel is relatively simple to manufacture, and inexpensive, but it has a number of drawbacks. Firstly, the expansion of the split portion of the mandrel shaft is conical, while the conical head rod is not guided by the shaft: consequently, the expansion of the split portion is irregular, with the result that gripping lacks precision. Secondly, the split portion of the shaft lacks rigidity and is liable to be deformed, or even fail, when the gripping mechanism is actuated in the presence or, which is worse, in the absence, of a workpiece; in this case, the only way of replacing the defective part is to replace the entire mandrel. Finally, the gripping diameter characterising each mandrel is unique, to within one finishing operation, with the result that the user has to change mandrels when he wishes to machine a workpiece having a bore with a diameter that differs sufficiently from that of the previous workpiece. Such drawbacks are obviously time consuming and lead to considerable extra cost.

In a second type of conventional mandrel (manufactured, moreover by the Applicant of present invention), the shaft has a forward pointing forward part of a conical shape. Unlike the mandrel described above, therefore, it is the expanding portion in this case that will slide axially to effect gripping or releasing. This expanding portion is constituted by a ring provided with longitudinal slits ("the sleeve"), which has, at least on its rear portion, an inner wall having the shape of a cone, or taper, the apex angle of which is equal to that of the cone over which the sleeve slides. The outer surface of the sleeve thus remains rigorously cylindrical during its expansion, thus ensuring perfectly precise, uniform gripping. In addition, there is no risk of failure or plastic deformation of the sleeve when it is caused to slide, in the presence or in the absence of a workpiece. Finally, to change over from one workpiece to another having a different bore diameter, it suffices to replace the sleeve (together with, if applicable, the portion of the drive mechanism attached to the sleeve), and not the entire mandrel.

A distinction can be made, moreover, generally speaking, in connection with this second type of conventional mandrel, between two types of drive mechanism, depending on whether the sleeve is driven in the area of its forward portion or of its rear portion. Devices for driving from the rear are quite suitable for gripping diameters that are relatively small (less than 15 mm, for instance), but they are all excessively bulky in the case of large gripping diameters as they are attached to the sleeve on its periphery. Devices for driving from the front use a piston with is precisely guided in a cylindrical bore provided along the axis of the mandrel shaft, from which it projects forwards, the forward ends of said piston and of the sleeve being fixed to one another. These forward drive devices provide the sleeve with strong internal support over the rear portion of the sleeve (since this rear portion bears on the conical portion of the shaft), but, in known designs, they do not offer strong internal support over the entire length of the sleeve; this (relative) fragility can prove particularly inconvenient when the sleeve is placed in contact with the workpiece to be gripped only over the forward portion of the sleeve, as one is sometimes compelled to do when the bore of the workpiece to be gripped is not very deep ("short gripping").

The object of the present invention is thus to provide an expanding mandrel ensuring gripping that is both precise and strongly supported, whatever the gripping length.

Another object of the present invention is to provide an expanding mandrel that is not bulky, whatever the gripping length.

Yet another object of the present invention is to provide an expanding mandrel permitting quick sleeve change, in such a way that it is possible, using the same mandrel body, to change over in a short space of time from one workpiece to be gripped to another having a different bore diameter.

These objects are achieved by means of a expanding mandrel comprising a shaft the forward end of which has the shape of a forward pointing truncated cone, an expanding sleeve constituted by a ring provided with longitudinal slits designed to slide over said conical forward end, and a piston which is guided in a cylindrical bore provided along the axis of the mandrel shaft, from which it projects forwards, with the sliding of said piston driving said sleeve so as to control the gripping or the releasing on said mandrel of a workpiece. According to the invention, the forward end of the piston has the shape of a rearward pointing truncated cone, and the inner wall of the sleeve has the shape of two successive truncated cones orientated head to tail (i.e. in mirror position), with the apex angle of the forward cone of the sleeve, which is capable of mating with said cone of the piston, being greater than the apex angle of the rear cone of the sleeve, which is capable of mating with said cone of the shaft.

According to certain particular characteristics, the cylindrical portion and the frustoconical portion of the piston are separated by a member capable of co-operating with a member separating the two conical portions of the inner wall of the sleeve.

According to certain additional characteristics, the piston is capable of being screwed at the rear, by inserting a screwdriver into a corresponding frontal recess provided on the piston, onto a pulling member sliding axially in said bore of the shaft.

According to certain particular characteristics, in said pulling member there has been transversely pierced a threaded through bore into which can be introduced a stop screw passing either through an oblong hole, or through a hole having a diameter corresponding to said stop screw, the positions of these two holes being in the rear portion of the shaft at diametrically opposed points.

Further advantages, objects and characteristics of the present invention will emerge from the following description of a form of embodiment of the invention, provided by way of example, said description being based on the annexed figures, wherein:

FIG. 2 is a longitudinal cross-section showing a first implementation of the mandrel illustrated in FIG. 1; and FIG. 3 is a longitudinal cross-section showing an second implementation of the mandrel illustrated in FIG. 1.

Figure 1:
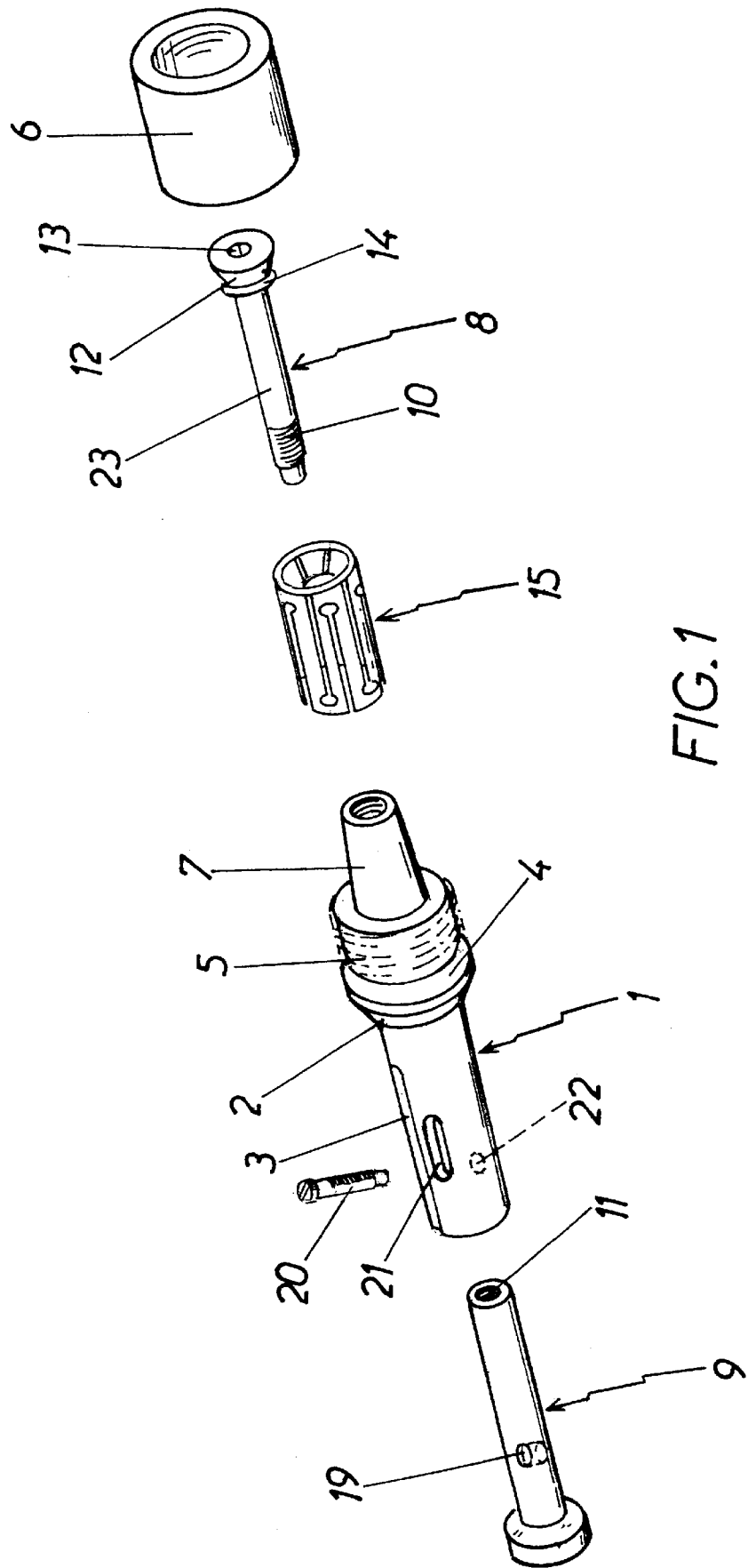
FIG. 1 is an exploded perspective view of an expanding mandrel according to the invention.

The figures show a mandrel comprising a mandrel body ("shaft") 1, the rear portion of which is designed to be inserted into the bore of a machine spindle (not shown). The figures show, by way of example, the method of mounting that goes under the name of "standard W"; said spindle bore has, at its forward end, a flared portion designed to receive median cone 2 of shaft 1, as well as a projection designed to be accommodated in a longitudinal groove 3 provided in the cylindrical rear portion of shaft 1 so as to determine the orientation of the mandrel when it is inserted into said bore. It goes without saying that the present invention is independent of the method of mounting the mandrel on the machine spindle, which could just as well be of the taper SA, metric taper, morse taper, shank, or the like.

Upon moving forwards along shaft 1, there is first found a collar 4 designed to come to bear on the machine spindle, and then a threaded cylindrical portion 5 over which can be screwed a hollow cylinder 6, internally threaded, which serves as an axial stop when the workpiece to be gripped (not shown) is loaded; the length of this stop 6 will thus be chosen as function of the dimensions of the workpieces to be machined. Finally, shaft 1 ends in a forward pointing truncated cone 7.

The shaft is pierced, along its axis, by a through bore comprising two portions, the forward portion having a diameter smaller than that of the rear portion. A piston 8 slides through the forward portion, and a pulling member 9 through the rear portion, it being possible to screw the piston 8 into the pulling member 9 using the respective threads 10 and 11.

Piston 8, which has naturally the shape of a cylinder 23 at the rear, ends, at the front, in a frustoconical screw head 12 having a frontal recess 13 capable of receiving a screwdriver. Cylindrical portion 23 and frustoconical portion 12 of piston 8 are separated by a collar 14.

By actuating piston 8, a sleeve 15 can be caused to slide rearwards or forwards along forward cone 7 of shaft 1 depending on whether it is wished to grip or release, respectively, a workpiece to be machined. Said sleeve 15 has, externally, the appearance of a ring into which several longitudinal slits have been cut. As to the inner wall of sleeve 15, it has the form of two successive frustoconical cones 17 and 18, orientated head to tail and separated by a groove 16. Whatever the position of piston 8, the forward cone 18 of sleeve 15 closely mates with conical screw head 12, and rear cone 17 of the sleeve closely mates with cone 7 of shaft 1, so that sleeve 15 is caused to change diameter while preserving the perfectly cylindrical shape of its outer surface, which ensures perfectly uniform gripping.

Collar 14 penetrates groove 16 of the sleeve (on the other hand, it would be possible, moreover, without departing from the scope of the invention, to provide for a collar on the inner surface of the sleeve, and a groove on the piston). As shown in FIGS. 2 and 3, the apex angle of forward cone 18 is, preferably, far greater than that of rear cone 17, so that, in use, the movement of piston 8 in relation to sleeve 15 (measurable by the translation of collar 14 in groove 16) is far smaller than the movement of sleeve 15 in relation to shaft 1. This makes it possible to give groove 16 a longitudinal dimension that is small in relation to the length of sleeve 15.

The invention thus attains the objective of strength mentioned in the introduction: it can, indeed, be seen that, thanks to the inner double-cone profile of the sleeve according to the invention, the latter is supported during gripping (by cone 7 of shaft 1 and cone 12 of guided piston 8) over its entire length, with the exception of the relatively narrow area of groove 16. A person skilled in the art could even contemplate completely dispensing with this groove and collar coupling; however, such a coupling is useful, particularly if it is wished to use quite small apex angles for cones 17 and 18, as, without it, sleeve 15 would be liable to remain jammed on shaft 1 at the time of release (the small apex angles have the advantage that, for a relatively small traction exerted on the pulling member, a relatively high gripping force is produced).

It will also be noted that this strength of the gripping device according to the invention has been obtained while, at the same time, offering optimum gripping precision (in the order of a hundredth of a millimeter).

An additional advantage of the mandrel according to the invention is that it makes it possible to use, for economy purposes, instead of a double-cone sleeve according to the invention, the conventional single-cone sleeve driven from the front described in the introduction. This option is naturally a compromise in which there is a loss of strength; however, it is particularly advantageous in the case of "short gripping" bringing into contact only the rear portion (bearing on the cone of the shaft) of the sleeve, but also in the case of "long gripping" as the cantilever situation brought about through the lack of support for the single-cone sleeve in its forward portion is a relatively minor drawback when the sleeve comes into contact with the workpiece to be gripped over a long length.

Another additional advantage of the mandrel according to the present invention is that it enables the sleeve to be replaced quickly. To do so, it suffices, in fact, to insert a screwdriver into the frontal recess 13 of piston 8, and to unscrew piston 8 from pulling member 9; it then merely remains to screw a new sleeve-piston assembly onto pulling member 9 (it is possible, if so wished, to detach piston 8 from sleeve 15 by considerably expanding the latter, but this is not advisable as, in addition to the time taken by the operation, it is liable to damage the sleeve).

In addition, and in order to permit the use of the expanding mandrel according to the invention with various types of machine spindle, two operating modes have been provided for: an "automatic" mode and a "manual" mode. The former concerns spindles comprising a control rod on which can be fixed pulling member 9; in this case, the movements of the latter will be restricted by introducing, into a threaded through bore 19 with which it is provided, a stop screw 20 which passes through an oblong nut 21 provided in the rear portion of shaft 1 (see FIG. 2). In the case of machine spindles not permitting such automatic control, the "manual" mode will be used: for this purpose, it suffices to introduce said stop screw 20 into a hole 22 having a matching diameter provided in the rear portion of shaft 1, in a position diametrically opposed to that of oblong hole 21, and then into bore 19 (at the end of it opposite the end used in "automatic" mode); the sliding of pulling member 9 is then blocked, and piston 8 is moved for gripping and slackening simply by screwing and unscrewing it in pulling member 9, using a screwdriver inserted into the frontal recess 13 (see FIG. 3).

The form of embodiment of the invention described above has been presented by way of an example illustrating the principles of the present invention, but it is quite clear that a person skilled in the art could take inspiration therefrom to produce other variants without thereby departing from the invention. There is nothing to prevent one, for example, from effecting "compensated gripping" using the mandrel according to the invention: this concerns the bores of workpieces having a slightly conical shape, for which use will be made of a suitable sleeve, that is to say a sleeve having, in place of the cylindrical outer surface described above, a conical surface corresponding to said workpiece bore; in such cases also, it will thus be possible to obtain gripping that its both strongly supported and precise.

What is claimed is:

1. Expanding mandrel comprising a shaft (1) the forward end of which has the shape of a forward pointing truncated cone (7), an expanding sleeve (15) constituted by a ring provided with longitudinal slits designed to slide over said conical forward end (7), and a piston (8) which is guided in a cylindrical bore provided along the axis of the mandrel shaft (1), from which it projects forwards, with the sliding of said piston (8) driving said sleeve so as to control the gripping or the releasing on said mandrel of a workpiece to be machined, characterised in that the forward end of the piston (8) has the shape of a rearward pointing truncated cone (12), and the inner wall of the sleeve (15) has the shape of two successive truncated cones (17, 18) orientated head to tail, with the apex angle of the forward cone (18) of the sleeve (15), which is capable of mating with said cone (12) of the piston, being greater than the apex angle of the rear cone (17) of the sleeve (15), which is capable of mating with said cone (7) of the shaft.

2. Expanding mandrel according to claim 1, characterised in that the cylindrical portion (23) and the frustoconical portion (12) of the piston are separated by a member (14) capable of co-operating with a groove (16) separating the two conical portions (17, 18) of the inner wall of the sleeve (15).

3. Expanding mandrel according to claim 1, comprising a piston (8) capable of being screwed at the rear onto a pulling member (9) sliding axially in a bore of the shaft (1), said pulling member being pierced transversely by a threaded through bore (19) into which can be introduced a stop screw (20) passing through a hole, characterised in that the said hole is either an oblong hole (21) or a hole (22) that has a diameter corresponding to said stop screw (20), the positions of these two holes (21, 22) being in the rear portion of the shaft (1) at diametrically opposed points.

* * * * *

UNITED STATES PATENT AND TRADEMARK OFFICE
CERTIFICATE OF CORRECTION

PATENT NO.   : 6,412,766 B2
DATED        : July 2, 2002
INVENTOR(S)  : Jacques Barbieux It is certified that error appears in the above-identified patent and that said Letters Patent is hereby corrected as shown below:

<u>Column 6,</u>
Line 21, "these two" should read -- the --.

Signed and Sealed this

Tenth Day of June, 2003

JAMES E. ROGAN
*Director of the United States Patent and Trademark Office*